Patented July 14, 1942

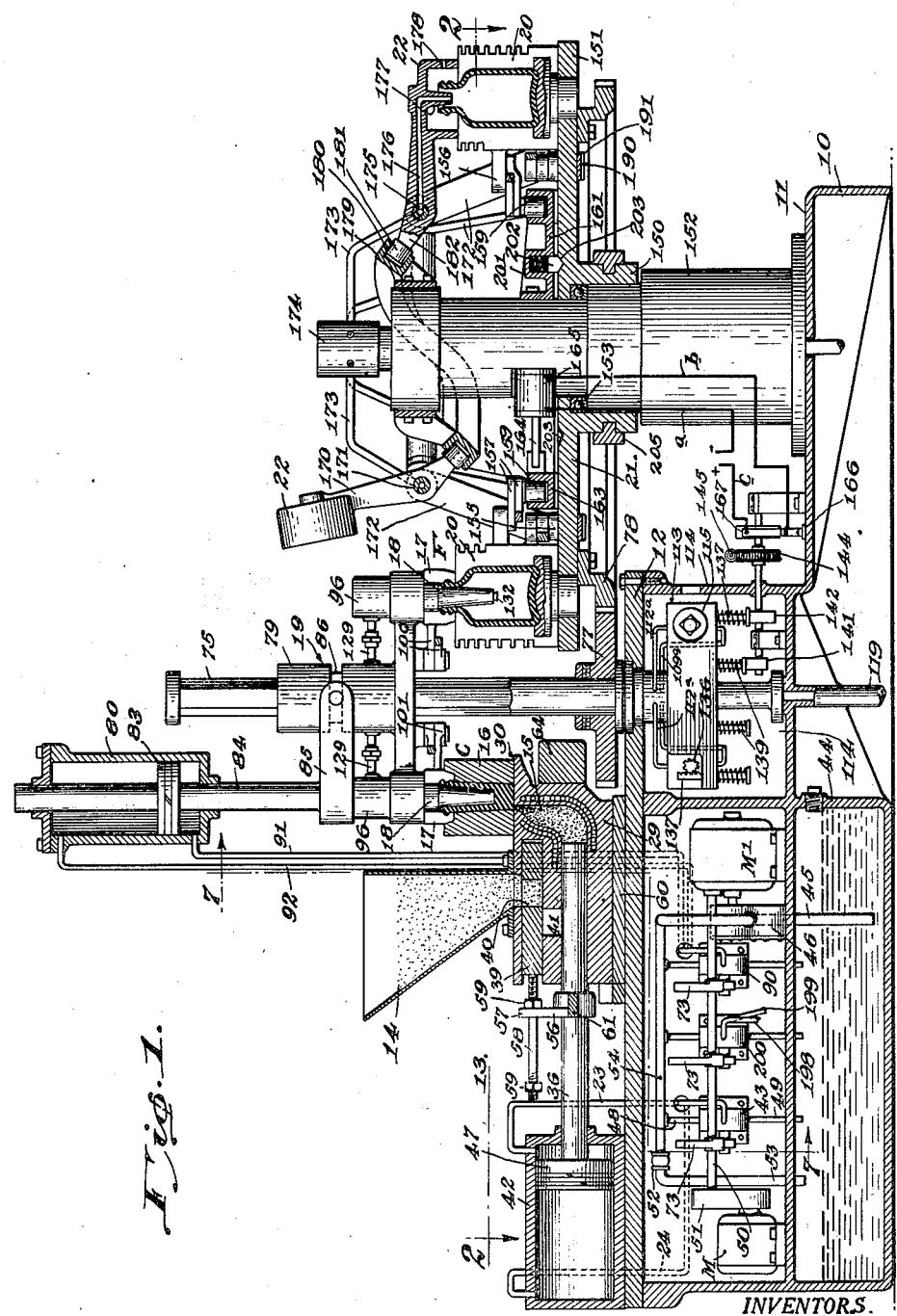

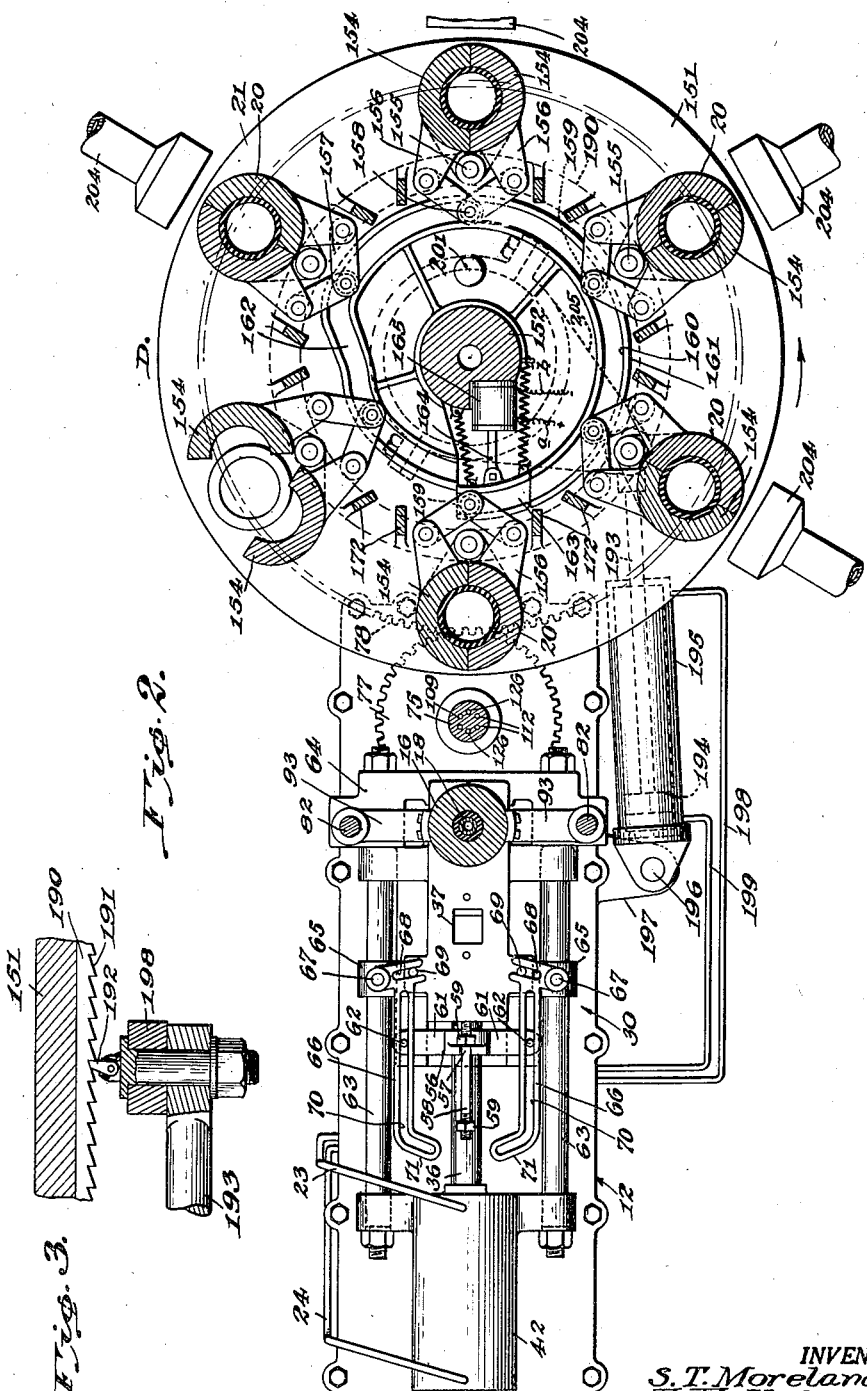

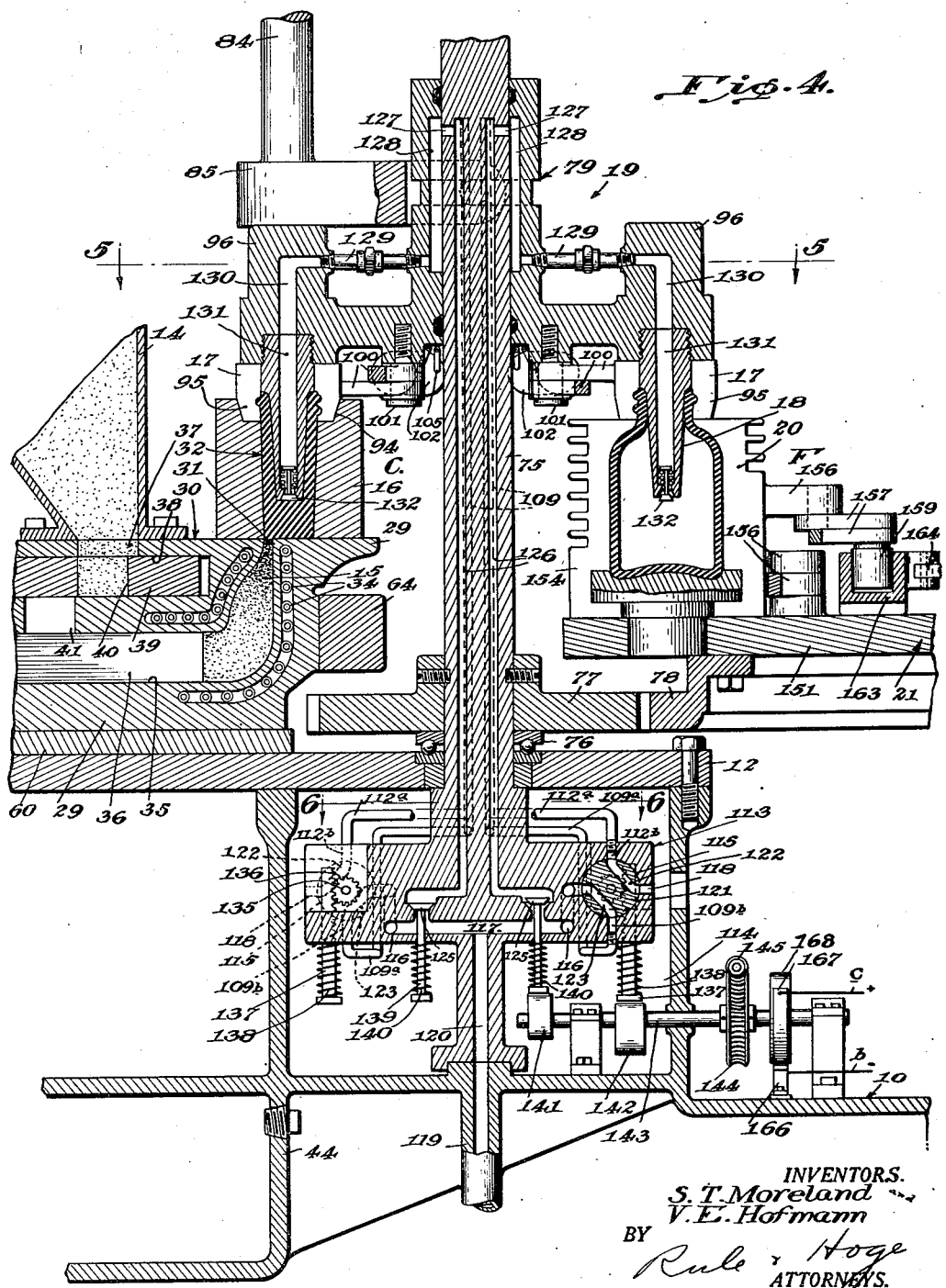

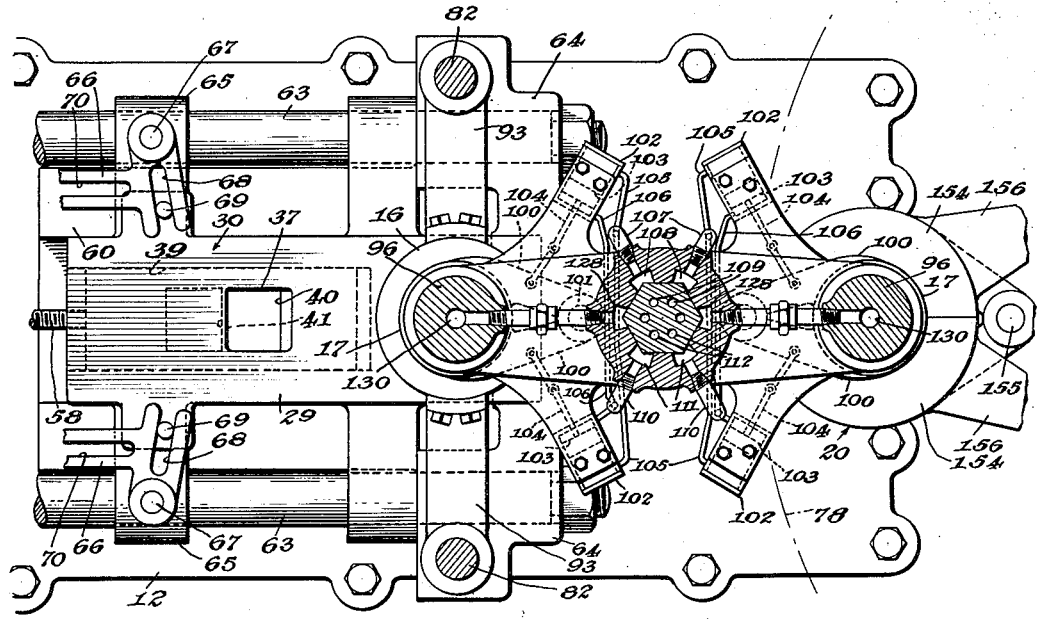
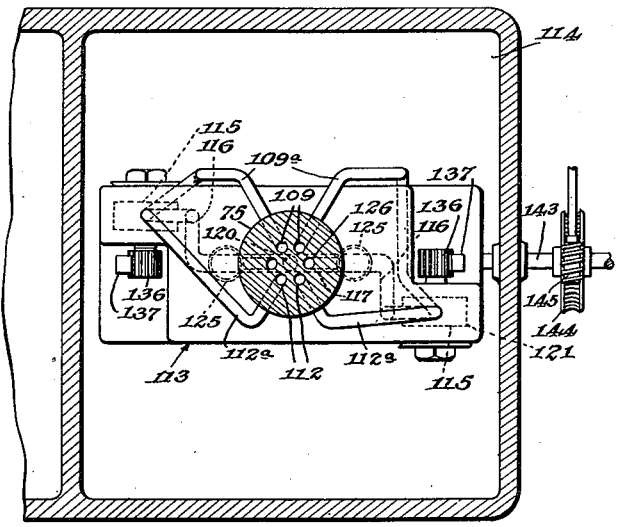

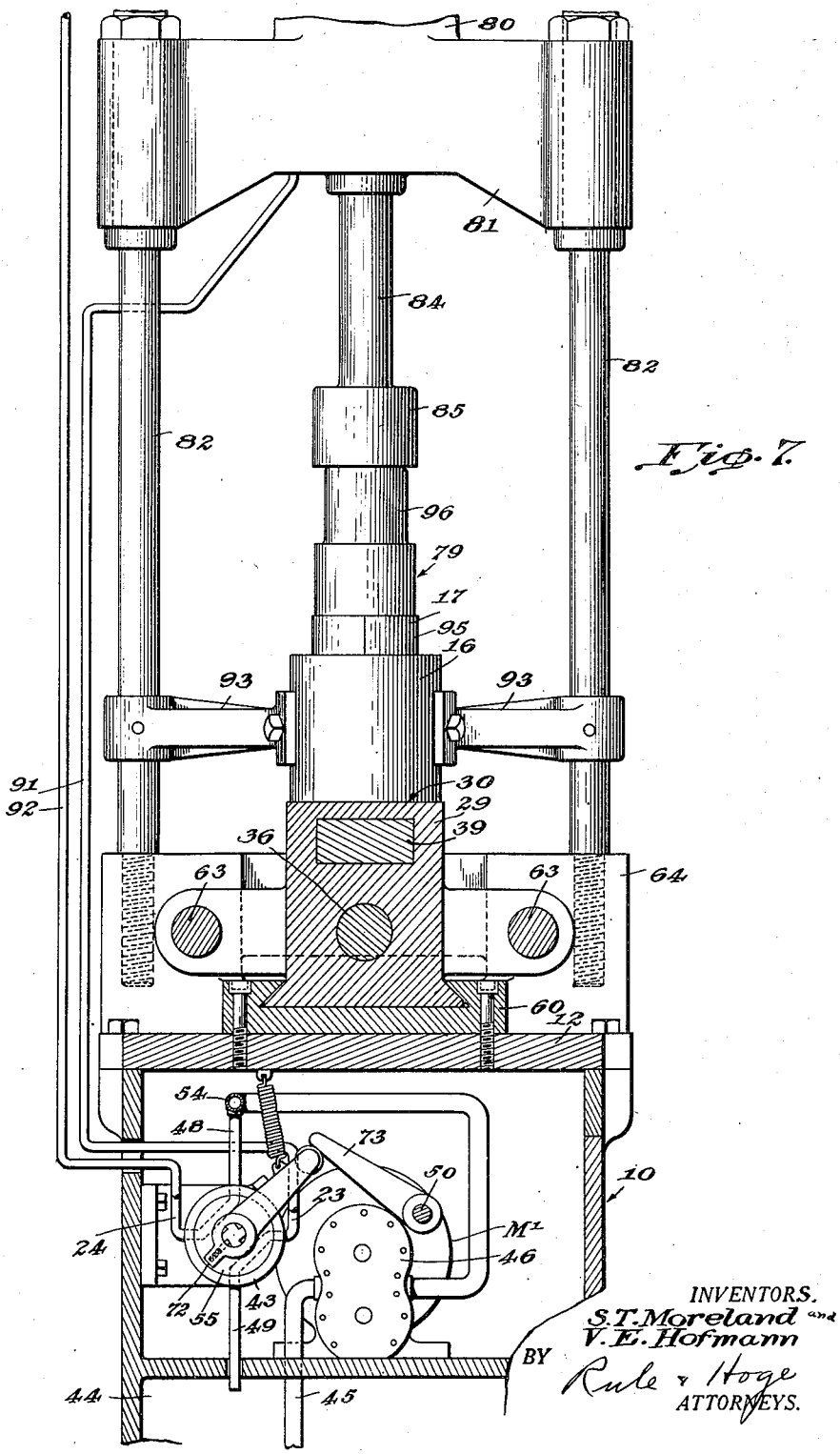

2,290,129

UNITED STATES PATENT OFFICE 2,290,129

APPARATUS FOR MOLDING PLASTICS

Stephen T. Moreland and Victor E. Hofmann, Toledo, Ohio, assignors to Owens-Illinois Glass Company, a corporation of Ohio Application September 7, 1938, Serial No. 228,732

7 Claims. (Cl. 18—5)

The present invention relates to an apparatus for molding synthetic resins, natural resins, and other thermoplastic heat-nonconvertible materials which are rigid at normal temperatures but which are capable of deformation under the influence of heat and pressure, these materials being utilized in granular bulk form.

The principal object of the invention is to provide a fully automatic apparatus for molding plastic materials to form hollow shapes such as bottles, jars, and the like, in which charges of the moldable material are formed into parisons or blanks in a blank mold and the parisons or blanks transferred to a finishing mold and expanded to final form therein.

In carrying out the above mentioned object, the invention contemplates the provision of an apparatus and method wherein charges of the granular material are withdrawn from a supply body thereof and are delivered repeatedly to a heating chamber wherein the material is rendered plastic and capable of being molded. Upon delivering each charge to the heating chamber, a portion of the heated material therein is displaced and delivered to a blank or parison mold having associated therewith a series of neck molds which successively move into cooperation therewith and which operate to transfer the parisons successively to a series of finishing molds in which the parisons are expanded by air pressure to final form and from which the articles are discharged as self-supporting articles.

Another object of the invention is to produce hollow blown articles from thermoplastic materials which are transparent and clear and devoid of milkiness and blemishes.

With these and many other objects in view, which will become readily apparent as the nature of the invention is better understood, the same consists in the novel combinations, constructions and arrangements of parts shown in the accompanying drawings, in which:

Fig. 1 is a longitudinal sectional view, with parts thereof in elevation, of a plastic molding machine constructed in accordance with the principles of the present invention;

Fig. 2 is a sectional view taken substantially along the line 2—2 of Fig. 1;

Fig. 3 is a fragmentary detail sectional view illustrating the manner in which the finishing mold table is periodically indexed;

Fig. 4 is an enlarged detail fragmentary longitudinal sectional view taken through a portion of the machine in the vicinity of the blank and neck mold structure;

Fig. 5 is a sectional view taken substantially along the line 5—5 of Fig. 4;

Fig. 6 is a sectional view taken substantially along the line 6—6 of Fig. 4; and Fig. 7 is a sectional view taken substantially along the line 7—7 of Fig. 1.

Brief description

Referring now to Fig. 1, the apparatus briefly involves in its general organization a stationary base 10 including a lower table 11 and an upper table 12. A charging mechanism 13 delivers measured charges of moldable material from a hopper 14 to a heating chamber 15 wherein the material is rendered plastic by the application of heat thereto. As each charge of material is delivered to the heating chamber 15, a portion of the plastic material already therein is displaced by the fresh charge and delivered to a blank or parison mold which exists by virtue of a fixed body blank or body parison mold 16 (of which there is only one) with which there is associated, one at a time, a series of neck mold units, each comprising a partible sectional neck mold 17 and a cooperating plunger 18, said units being supported upon a rotatable carriage 19 which is adapted to be indexed periodically through a predetermined angle. While any number of neck mold units may be utilized in the series, only two have been disclosed, they being arranged in diametrically opposed positions on the carriage and provision being made whereby the carriage is indexed throughout an angle of one hundred and eighty degrees to interchange the positions thereof. Such periodic indexing of the carriage 19 moves the neck molds 17 alternately from a mold charging station C, wherein they cooperate successively with the body blank mold 16 in forming a mold cavity, to a forming station F wherein the blanks which are suspended therefrom are enclosed by successive molds 20 of a series of partible sectional finishing molds carried by a rotatable carriage 21. The blanks or parisons are expanded against the walls of the finishing molds at the forming station by a blowing operation utilizing the plungers 18 and thus assume the shape of the hollow articles which it is desired to form. After the articles have been fully formed at the forming station, the neck molds are removed and a series of cooling heads 22, of which there is one for each finishing mold, are lowered into operative position and registry with the upper end of their respective molds and function to admit cooling air to the interior of the formed articles to cool and solidify the same. Upon solidification of the articles, the sectional finishing molds open to discharge the articles at a discharging station D (Fig. 2).

*The charging mechanism*

The charging mechanism 13 is best illustrated in Figs. 1, 2, 4 and 7 and comprises a block or casting 29 having an upper surface 30 in sealing contact with the lower end of the body parison mold 16 and provided with an injection aperture 31 normally in register with the mold cavity 32 of the latter. The aperture 31 communicates with the heating chamber 15 formed in the block 29. A series of electrical heating elements 34 encompass the chamber 15 and are adapted to be continuously energized to render plastic the collective charges of moldable material supplied to the latter. The chamber 15 communicates with a cylindrical bore 35 into which there extends the forward end of a reciprocable charging ram 36. The hopper 14 for the moldable material is secured to the block 29 and communicates through an opening 37 with a longitudinal pocket 38. A charge segregating and measuring member 39 slidably disposed in the pocket 38 has formed therein a charge opening 40 which is adapted, upon reciprocation of the member 39, to register with the opening 37 to receive a charge of moldable material therein and transfer the same to a position of register with a slot 41 which extends between the pocket 38 and bore 35. The charges of material thus moved into register with the slot 41 fall by gravity into the bore 35 immediately ahead of the ram 36 when the latter is in its rearmost position. Upon the charging stroke of the ram, the charge is forced into the heating chamber 15 while at the same time a previously introduced charge is displaced by the fresh charge and is injected into the cavity existing by virtue of the body parison mold 16 and one of the cooperating neck molds 17.

The ram 36 is hydraulically operated by means of a piston 47 which is mounted on the rear end thereof and which is slidably disposed in a cylinder 42, the latter being supported upon the table 12. Opposite ends of the cylinder are connected through conduits 23 and 24 to a control valve 43 by means of which fluid is directed alternately to these ends to actuate the piston. Fluid contained in a reservoir 44 provided in the base 10 is drawn through a stand pipe 45 by means of an oil pump 46 from whence it is directed through a manifold pipe 54 and branch pipe 48 to the valve 43. The valve 43 is provided with a return flow pipe 49. This valve is of the four-way rotor type, the rotor 55 thereof (Fig. 7) being periodically indexed from a shaft 50 which is connected through a gear reduction device 51 to a motor M. A ratchet type of indexing mechanism 72 is adapted to be periodically actuated by a finger 73 carried by the shaft 50 to index the rotor 55 through an angle of ninety degrees and actuate the charging mechanism in timed relation to the various other phases of machine activity. A relief valve 52 disposed in the manifold pipe 54 directs fluid through a return flow pipe 53 if the pressure developed by the pump 46 becomes excessive. The oil pump 46 is driven continuously by a motor M¹.

Referring now to Figs. 1 and 2, a crosshead 56 secured to the ram 36 medially thereof has formed thereon an upstanding finger 57 the upper end of which is bifurcated and straddles a rod 58, one end of the latter being anchored in the charge segregating and measuring member 39. A pair of spaced abutments 59 in the form of nuts threaded on opposite ends of the rod 58 are adapted to be alternately engaged by the finger 57 as the ram approaches the end of its stroke in either direction to move the member 39 alternately in opposite directions and periodically transfer charges of material from the hopper 14 to the bore 35 in the path of movement of the ram 36.

*The charge severing mechanism*

In order that each charge of plastic material injected into the mold cavity 32 shall be severed from the material contained in the heating chamber 15, the casting 29 is capable of limited longitudinal sliding movement in a guide member 60 (Fig. 7) secured to the table 12. The extent of such sliding movement is slight and is barely sufficient to move the injection aperture from its normal position of registry with the mold cavity 32. Toward this end, the crosshead 56 has formed thereon a pair of lateral extensions 61 each provided with an upstanding pin 62. A pair of parallel extending guide rods 63 connecting the cylinder 42 and a crossbar 64 formed on the guide member 60 extend through a pair of ears 65 formed on the casting 29. A pair of levers 66 are pivoted as at 67 to the ears 65 and are provided with short inwardly extending slots 68 into which a pair of upstanding pins 69 provided on the casting 29 extend. The levers 66 are provided with longitudinal slots 70 into which the pins 62 extend. The rear free ends of the levers 66 are turned inwardly as at 71 and thus it will be seen that when the ram 36 approaches its rearmost position, the pins 62, riding in the slots 70, cause the free ends of the levers 66 to move outwardly, thus shifting the casting 29 and effecting shear of the plastic material in the heating chamber 15.

*The plunger and neck mold supporting carriage*

Referring now to Figs. 1 and 4, the rotatable carriage 19 includes a rotatable central support or column 75 which projects through and is rotatably journaled in the table portion 12 of the base 10 by means of antifriction bearings 76. A gear 77 secured to the column 75 meshes with a ring gear 78 associated with the carriage 21 and thus the movements of the two carriages 19 and 21 are synchronized for proper cooperation as will be set forth hereinafter.

A plunger and neck mold supporting head 79 is splined to the column 75 in the upper regions thereof and is movable from a position wherein the plungers 18 and neck molds 17 cooperate with the blank and finishing molds 16 and 20 simultaneously, to a raised position wherein these plungers and molds clear the blank and finishing molds. Raising and lowering of the supporting head 79 is accomplished by means of a cylinder 80 supported above the level of the head 79 on a crosspiece 81 (Fig. 7) which in turn is supported on a pair of vertical rods 82 the lower ends of which are threadedly received in the crossbar 64. A piston 83 disposed in the cylinder is mounted on a rod 84 the lower end of which carries a bifurcated member 85 having a pin and slot connection 86 with the supporting head 79. Thus, it will be seen that upon reciprocation of the piston 83 in the cylinder 80, the head 79 will be lowered and raised to move the neck mold and plunger instrumentalities into and out of operative cooperation with the blank and body molds.

The movements of the piston 83 are controlled by means of a control valve 90 which is similar to the control valve 43 and which is disposed above the reservoir 44 and the rotor of which is driven from the shaft 50. Accordingly, the opposite ends of the cylinder 80 are connected through conduits 91 and 92 to the valve 90.

*Cooperation between plunger and neck mold structure and the parison and finishing molds*

Referring now to Figs. 4 and 7, the body blank mold 16 is supported above the casting 29 by means of tie members 93 secured to the rods 82. The open upper end of the body blank mold 16 is formed with a tapered recess 94 therein and the lower end of the sections 95 of each neck mold 17 are correspondingly tapered so that when the sections are closed upon each other and the head is in its lowermost position the tapered portion of either neck mold 17 will accurately fit into the recess 94 in sealing engagement therewith. The head 79 is formed with a pair of diametrically opposed enlargements 96 from which the plungers 18 are suspended. The sections 95 of the neck molds 17 are adapted to be closed about the plungers 18 immediately below the enlargements 96. The enlargements are movable upon indexing of the carriage 19 into alignment with the rod 84 with their upper surfaces in engagement with the underneath surface of the member 85. Thus when fluid is admitted to the upper end of the cylinder 80 and the head 79 is in its lowermost position, the closed sections 95 of one neck mold at the charging station C is held in tight sealing engagement with the body blank mold 16 and with the plunger 18 disposed in the mold cavity 32 while the closed sections of the other neck mold at the forming station F are held in sealing engagement with the upper surface of one of the finishing molds 20.

*Opening and closing mechanism for the neck molds*

The sections 95 of each neck mold 17 are carried at the outer end of a pair of arms 100, the inner ends of which are pivoted as at 101 to the head 79. Opening and closing of the sections upon the plunger 18 is effected by means of a pair of cylinders 102 (Fig. 5) having pistons 103 therein provided with rods 104 connected by means of links to the arms 100. The outer ends of each pair of cylinders 102 are connected together by a conduit 105 and the inner ends thereof are similarly connected by a conduit 106.

The conduits 105 are each connected through a pipe section 107 to the lower end of a vertically extending groove 108 formed in the head 79. The upper ends of the grooves 108 communicate through horizontal passageways provided in the column 75 with respective vertical bores 109 extending longitudinally through the column.

Similarly, the conduits 106 are each connected through a pipe section 110 to the lower end of a vertically extending groove 111 formed in the head 79. The upper ends of the grooves 111 communicate through horizontal passageways provided in the column 75 with respective vertical bores 112 formed in the column 75.

The lower portion of the column 75, below the table portion 12 of the base 10, has formed thereon an enlarged valve head 113 (Figs. 4 and 6) which is generally of rectangular configuration and which is housed in a chamber 114 provided in the base 10. The lower ends of the bores 109 communicate with respective conduit sections 109$^a$ that in turn communicate through passageways 109$^b$ leading to respective valve chambers 115 formed in the valve head 113. The lower ends of the bores 112 communicate with respective conduit sections 112$^a$ that in turn communicate through passageways 112$^b$ leading to the valve chambers 115. The valve chambers 115 communicate through respective passageways 116 with a pressure chamber 117 formed in the valve head 113. These chambers 115 also communicate through respective passageways 118 with the atmosphere. The pressure chamber 117 is connected to a conduit 119 leading from a source of air under pressure through a bore 120 formed in the lower end of the column 75.

Each valve chamber 115 is cylindrical in form and has mounted therein a rotor 121 adapted to periodically be indexed through an angle of ninety degrees in a manner presently to be described.

Each rotor 121 is provided with passageways 122 and 123 therein which, upon successive indexing operations of the rotor, succeed each other in alternatively connecting the passages 109$^b$ and 112$^b$ to the passage 116 leading to the pressure chamber 117 and to the passage 118 leading to the atmosphere. In the position of the rotors 121 shown in Fig. 4, wherein one neck mold 17 is closed upon the parison or blank at the charging station C and the other neck mold is closed upon the article undergoing formation at the forming station F, air under pressure is simultaneously transmitted to the outer ends of the cylinders 102 of each pair thereof from the source 119, through the bores 120, pressure chamber 117, passageways 116, rotors 121, passageways 109$^b$, grooves 108, pipe sections 107, and conduits 105. At the same time the inner ends of the cylinders 102 are vented to atmosphere through the conduits 106, pipe sections 110, grooves 111, vertical bores 112, conduit sections 112$^a$, passageways 112$^b$, rotors 121, and passageways 118. Upon movement of the rotors 121 through an angle of ninety degrees, the flow of air under pressure from the source 119 to the inner ends of the cylinders 102 and the exhaust of air from the outer ends thereof may readily be traced through the various conduit sections, passageways and valves. It is to be noted in this respect that the vertical bores 109 and 112 provided in the column 75 are utilized to conduct air under pressure to the cylinders as well as to exhaust air therefrom.

*The article blowing mechanism*

The pressure chamber 117 (Fig. 4) communicates through a pair of valves 125 with a pair of vertical bores 126 formed in the column 75. The bores 126 communicate through horizontal passageways 127 with a pair of vertical grooves 128 which are connected by means of pipe sections 129 with passageways 130 formed in the enlargements 96 of the head 79. The passageways 130 communicate with bores 131 that extend through the hollow plungers 18. Check valves 132 at the lower ends of the plungers prevent air utilized in the blowing process from being returned through the line from whence it came and also assist in maintaining blowing pressure in the finishing molds 20 after the valves 125 have become closed.

*Operating instrumentalities for neck mold opening and closing valves and for the blowing valves*

Still referring to Fig. 4, the rotors 121 are mounted on shafts 135 which are journaled in the valve head 113 and which carry gears 136 thereon that mesh with racks 137, the latter projecting below the bottom of the valve head. Coil springs 138 normally serve to maintain the racks in their lowermost position wherein the rotors 121 assume the position shown in Fig. 4.

The valves 125 are provided with stems 139 that project below the valve head 113 and are maintained normally in their seated position by means of springs 140.

When either neck mold and plunger assembly is in operative position at the forming station F, the control valves therefor assume a position in the chamber 114 wherein the valve stem 139 and rack 137 are in register with the path of movement of a pair of eccentric cams 141 and 142 respectively. The cams 141 and 142 are mounted on a common horizontal shaft 143 which carries a worm gear 144 by means of which the shaft is driven from a worm 145 connected in a suitable manner to a source of driving power synchronized with the various other phases of machine operation.

*The finishing mold carriage*

The rotatable finishing mold carriage 21 includes a hub 150 and a platform 151, the former being mounted for rotation on a central support or column 152 by means of antifriction bearings 153. The finishing molds 20 (of which six have arbitrarily been disclosed) are equally spaced about the periphery of the platform 151 and the sections 154 of each mold are pivoted as at 155 to the platform for swinging opening and closing movements.

*Opening and closing mechanism for the finishing molds*

The sections 154 of each finishing mold have formed thereon an arm 156, the arms being connected to a pair of links 157 which are connected together by means of a pintle 158 carrying a cam roller 159. The various rollers 159 travel in a cam groove 160 provided at the periphery of a stationary cam plate 161 which is secured to and supported from the central column 152. The major portion of the cam groove 160 extending from a point near the forming station F to a point near the discharging station D is circular and the rollers 159 traveling therein operate to maintain the sections 154 closed upon each other. The groove 160 is formed with an inward bend 162 in the vicinity of the discharging station D into which the rollers 159 ride when the molds 20 arrive at the latter station in order to open the molds and permit the formed articles therein to be discharged. After the articles have been discharged from the molds 20 at the station D, the molds proceed to the forming station F with the sections 154 thereof in an open position and, immediately thereafter when the plunger and neck mold supporting head 79 are lowered to center a parison or blank between the open finishing mold sections 154, means is provided for closing the mold sections 154 about the parison preparatory to commencement of the blowing operation.

Toward this end, the cam plate 161 is provided with a radially shiftable section 163, including a fragment of the cam groove 160, which is connected by a link 164 to the movable core of a solenoid 165, the latter being mounted on the central column 152. Wires a and b (Figs. 1, 2 and 4) connect the solenoid 165 with a source of energizing current and with a stationary contact 166 designed for intermittent sliding engagement with a movable contactor 167 carried on a disk 168 mounted on the shaft 143. The contactor 167 is connected through a collector ring (not shown) to a wire c leading from the source of current. Rotation of the shaft 143 is so synchronized with the various phases of machine operation that the contactor 167 is adapted to intermittently engage the stationary contact 166 when the head 79 is in its lowermost position. When the circuit has been closed, the solenoid 165 is actuated to shift the section 163 of the cam plate 161 outwardly and thereby move the cam roller 159 outwardly to close the sections 154 of the mold 20 about the parison at the forming station.

When the shiftable section 163 is in its outermost position, it is in alignment with the circular portion of the groove 160. Thus, after the article has been blown to final shape and the carriage 21 is indexed to convey the mold 20 to the discharge station D, the roller 159 will move into this circular portion of the groove 160 and the mold 20 will remain closed until such time as the inward bend 162 is encountered.

*Mechanism for applying cooling air to the interior of the finishing molds*

Referring now to Fig. 1, each cooling head 22 comprises a cup-shape member, the rim of which is designed for sealing engagement with the upper surface of its respective finishing mold 20. The head is formed integrally with an arm 170 which is pivoted for swinging movement in a vertical plane on a short pipe section 171 the latter being supported between a pair of standards 172 carried by the platform 151. The pipe sections 171 are connected by means of branch conduits 173 with the interior of a hollow rotatable cooling air supply chamber 174 carried at the upper end of the column 152. Each pipe section 171 has formed therein a slot 175 adapted to register with a bore 176 formed in the arm 170 when the head 22 is in its lowered position in contact with its respective mold 20. The bore 176 communicates with a hollow nipple 177 adapted to extend into the neck of the article contained within the mold in order that cooling air may be circulated through the article. A vent 178 formed in the side wall of the head 22 permits cooling air to escape to the atmosphere.

Raising and lowering of the heads 22 is effected by means of a stationary cam track 179 which is supported from the column 152 and which provides a cam groove 180 into which a series of cam rollers 181 formed on extensions 182 provided on the arms 170 extend. The cam track 179 is so designed that the heads 22 become raised immediately prior to arrival of the molds at the discharge station D and remain raised until the sections 154 of the molds are closed upon the parison at the forming station F and the molds have commenced to move toward the discharge station.

*Indexing mechanism for the finishing mold carriage*

Referring now to Figs. 1, 2 and 3, periodic indexing of the finishing mold carriage 21 through an angle of sixty degrees is effected by means of a circular rack 190 secured to the underneath side of the platform 151. The rack 190 is provided with ratchet teeth 191 which are adapted to be engaged by a spring pressed pawl 192 carried at the outer end of a plunger 193 connected to a piston 194 disposed in a cylinder 195 pivoted as at 196 to a bracket 197 formed on the upper table portion 12 of the base 10. The outer end of the plunger 193 is guided by means of a horizontal rock arm 205 pivoted to oscillate about the axis of the column 152 and thus engagement between the pawl 192 and rack 190 is always insured. Conduits 198 and 199 connect opposite ends of the cylinder 195 to an actuating valve 200 which is identical with the actuating valves 43 and 90 and which is similarly periodically indexed from the common shaft 50 in timed relation to the various other phases of machine operation.

The stroke of the piston 194 is of a magnitude sufficient to impart rotary movement to the carriage 21 at each stroke thereof through an angle of sixty degrees. A hollow boss 201 (Fig. 1) formed on the stationary cam plate 161 provides a mounting for a spring pressed holding dog 202 which is adapted to enter a depression 203 (of which there are six) formed in the platform 151 after each successive indexing operation to insure accuracy of alignment of the neck molds and finishing molds at the forming station F.

Cooling of the finishing molds

Upon each indexing movement of the carriage 21 the various molds 20 are advanced through an angle of sixty degrees in the direction indicated by the arrow in Fig. 2. A series of blow pipes 204 (Fig. 2) positioned about the periphery of the carriage 21 and spaced apart sixty degrees with respect to the axis of the carriage serve to direct cooling air against the molds 20 during the interval between indexing operations. These pipes 204 are adapted to direct air inwardly of the carriage 21 continuously. Where the articles undergoing formation are transparent in the final product, experience has shown that it is essential to maintain the temperature of the finishing molds at the forming station F at substantially room temperatures or at least not above 110° F. if articles which are clear and devoid of milkiness and air bubbles are to be produced. Accordingly the cooling air which is directed against the finishing molds in addition to cooling the enclosed articles therein also conditions the molds for the next succeeding forming operations.

Operation of the apparatus

In actual operation, the hopper 14 (Fig. 1) is maintained supplied with the solid granular thermoplastic material from which measured charges thereof are periodically segregated and transferred to the cylindrical bore 35. Reciprocation of the charging ram 36 forces these charges into the heating chamber 15 wherein they displace a quantity of the material that has previously been rendered plastic by virtue of the heat supplied by the heating elements 34. The displaced material is injected through the aperture 31 into the mold cavity 32 existing by virtue of the fixed body blank mold 16 and the cooperating plunger 18 and neck mold 17.

Immediately thereafter, and while the ram 36 is retracted preparatory to its next succeeding charging stroke, the control valve 90 is actuated to elevate the piston 83 and raise the head 79 and thus withdraw the parison from the mold 16, the parison being suspended from the neck mold 17.

Following the elevation of the head 79, the control valve 200 is actuated and, through the medium of the piston 194 (Fig. 2), the finishing mold carriage is indexed through an angle of sixty degrees. Motion of the carriage 21 is transmitted to the carriage 19 by virtue of the gears 77 and 78 and the latter carriage is indexed through an angle of one hundred eighty degrees, thus interchanging the positions of the neck molds 17. The parison suspended from the neck mold at the charging station C is transferred to the forming station F and is suspended above the open sections 154 of one of the finishing molds 20 which has moved into position at this latter station.

Immediately after the indexing operation, the control valve 90 is actuated to lower the head 79 and, when the head approaches its lowermost position, the contactor 167 (Fig. 4) engages the stationary contact 166 and the circuit through the solenoid 165 (Fig. 2) is closed. Upon energization of the solenoid 165, the movable section 163 of the cam plate 161 is moved outwardly and the sections 154 of the finishing mold at the forming station F are closed upon the parison which has been lowered into position between the mold halves.

After the finishing mold sections become closed, one of the valves 125 (Fig. 4) is elevated from its seat by the cam 142 and blowing air is applied to the interior of the finishing mold to expand the parison to its final shape.

Prior to the next indexing operation of the mold carriage 21, one of the valve rotors 121 is actuated by the cam 142 and the pistons 103 (Fig. 5) are moved in such a manner as to cause the sections 95 of the neck mold 17 to open and release the neck of the formed article.

Upon such release of the article by the sections of the neck mold, the head 79 is elevated in the manner previously described so that the neck mold will clear the finishing mold when the carriage 21 is next indexed and the molds move away from the forming station F.

After the head 79 is elevated the mold carriage 21 is again indexed and during movement of the finishing mold 20 away from the forming station, the cooling head 22 is lowered into cooperating engagement with the mold 20. As the cooling head 22 comes into engagement with the mold 20, the bore 176 comes into register with the slot 175 and cooling air is circulated in the relatively soft formed article.

During the next several indexing operations of the mold carriage 21, the finishing mold with the formed article contained therein is moved successively through a series of sixty degree angles and during each pause of the carriage 21, cooling air issuing continuously from the blow pipes 204 impinges against the outside of the mold 20 to further cool the same by convection.

As the mold approaches the discharge station D, the roller 159, entering the inward bend 162 provided in the cam groove 160, causes the mold sections to open and permit the solidified article to be discharged therefrom.

Modifications may be resorted to within the spirit and scope of the appended claims.

We claim:

1. A machine for forming hollow articles from plastic material, comprising a parison mold open at its upper end and having a stationary mounting, a neck mold carrier, a neck mold unit on said carrier comprising a plunger and a neck mold surrounding the plunger and defining therewith an annular neck mold cavity, means for moving said carrier up and down and thereby moving the plunger and neck mold as a unit out of and into a position of engagement with the parison mold with the plunger projecting downward within the mold, means for injecting charges of plastic material into the mold while the plunger is in said position, a finishing mold carriage, finishing molds thereon, means for rotating the carriage intermittently step by step and thereby bringing the finishing molds in succession to a transfer station, means for rotating the neck mold carrier step by step in synchronism with the rotation of said carriage and thereby moving the neck mold alternately from a charge-receiving station to said transfer station, and means for transferring parisons from the neck mold to the finishing molds at said transfer station.

2. A machine for forming hollow articles, comprising a parison mold, a neck mold carrier mounted for rotation about a vertical axis, neck mold units on said carrier at opposite sides of said axis, each said unit comprising a plunger and a neck mold surrounding the plunger and defining therewith an annular neck mold cavity, means for rotating said carrier and thereby bringing said units alternately to a position directly over the parison mold, means for lowering and lifting said carrier and thereby lowering and lifting each neck mold unit into and out of a position in which the neck mold and parison mold are juxtaposed and the plunger projects into the parison mold, means for injecting charges of plastic material into the molds while in said juxtaposed position and thereby forming parisons therein, finishing molds, and means for transferring parisons from each neck mold unit to a finishing mold while the other neck mold unit is in juxtaposition to the parison mold.

3. A machine for forming hollow articles from plastic material, comprising a parison mold open at top and bottom, a neck mold carrier mounted for rotation about a vertical axis and for up and down movement, neck molds mounted on said carrier at opposite sides of said axis, plungers on said carrier and projecting downwardly through the neck molds, means for rotating the carrier intermittently and thereby bringing the neck molds alternately to a position over the parison mold, means for lowering the carrier and thereby bringing a neck mold into juxtaposition with the parison mold and projecting the associated plunger downward into the parison mold, means for forcing a charge of the plastic material through the lower end of the parison mold while a plunger is in said projected position therein and thereby forming a parison in the juxtaposed molds, finishing molds, and means for transferring each parison from a neck mold into a finishing mold while the other neck mold is over the parison mold.

4. An apparatus for forming hollow articles from synthetic resins, comprising a stationary body parison mold, a movable finishing mold, a neck mold unit comprising a plunger projecting into the parison mold through one end thereof and a neck mold surrounding the plunger and closing said end of the parison mold, automatic means for injecting a charge of plastic material into the parison mold through the other end thereof while the plunger and neck mold are in said position, automatic means operable thereafter to withdraw said neck mold unit from the parison mold with the charge of plastic material and move it into a position of cooperation with the finishing mold wherein the plunger is projected into the finishing mold cavity, and means for blowing the parison to final shape within the finishing mold.

5. In an apparatus for forming hollow articles from thermoplastic materials, the combination of a parison forming mechanism including a single body parison mold and a plurality of cooperating neck mold units, each neck mold unit comprising a plunger and a neck mold surrounding the plunger, automatic means for moving said neck mold units in succession into a position in which the neck mold unit closes one end of said parison mold and the plunger projects into the mold, automatic means for introducing charges into plastic material into the parison mold while a neck mold unit is in said position, a plurality of partible finishing molds, transfer instrumentalities for moving the neck mold units out of cooperation with the body parison mold and into cooperation with the finishing molds, said instrumentalities including means for elevating the neck mold units and thereby withdrawing a said unit from the body parison mold with the parison surrounding the plunger and suspended from the neck mold and for lowering the neck mold units and thereby lowering the suspended parison into a position of registry with a finishing mold, means for closing the finishing molds about the suspended parisons, and automatic means for synchronizing the operation of the transfer instrumentalities and the movements of the finishing molds.

6. In an apparatus for forming hollow articles from thermoplastic materials, a parison forming mechanism including a single stationary body parison mold positioned at a charging station, a series of partible finishing molds, means for moving the finishing molds from a forming station to a discharging station, a pair of neck mold units, each comprising a plunger and a neck mold surrounding the plunger, means for moving each said unit from a position of cooperation with the body parison mold at the charging station, with the plunger projecting into the parison mold and the neck mold and plunger closing the end of the parison mold, to a position of cooperation with the finishing molds at the forming station, in which last mentioned position the finishing molds and neck mold units together provide mold cavities of the shape of the finished articles, means for injecting charges of plastic material into the parison mold cavities at the charging station while the neck molds and plungers are in said cooperative position, means for moving the neck mold units to transfer the parisons from the body parison mold to the finishing molds while the parisons surround the plungers and are suspended from the neck molds, means for closing the finishing molds about the parisons at the forming station, means for blowing the parisons within the finishing molds, means for thereafter withdrawing the neck molds and plungers, and means for opening the finishing molds at the discharging station.

7. In an apparatus for forming hollow shapes from thermoplastic materials, a stationary, open-ended, parison mold positioned at a charging station, a rotary carriage, an annular series of finishing molds thereon, means for periodically indexing said carriage and thereby moving the finishing molds past forming and discharge stations, a second carriage, diametrically opposed neck mold units thereon, each comprising a neck mold and a plunger, means cooperating with said second carriage for moving one neck mold unit into position to close an open end of the parison mold and cooperate with the parison mold to form a parison mold cavity and simultaneously move the other neck mold unit into position to cooperate with a finishing mold at the forming station to form a mold cavity for the finished article, and vice versa, means for injecting charges of plastic material into successively formed parison mold cavities at the charging station while the neck mold units are in said position for closing the parison mold, means transmitting motion of the first carriage to the second carriage and thereby interchanging the positions of the neck mold units upon each indexing operation of the first mold carriage, and means for expanding the parisons to final shape in the finishing molds.

STEPHEN T. MORELAND.
VICTOR E. HOFMANN.